(12) United States Patent
King et al.

(10) Patent No.: US 6,976,685 B1
(45) Date of Patent: Dec. 20, 2005

(54) WHEELED CAR SEAT

(75) Inventors: William L. King, Denver, CO (US);
Glenn Schmierer, Golden, CO (US)

(73) Assignee: Samsonite Corporation, Denver, CO (US)

( * ) Notice: Subject to any disclaimer, the term of this patent is extended or adjusted under 35 U.S.C. 154(b) by 0 days.

(21) Appl. No.: 10/370,141

(22) Filed: Feb. 18, 2003

Related U.S. Application Data

(63) Continuation-in-part of application No. 29/155,584, filed on Feb. 18, 2002, now Pat. No. Des. 471,727.

(60) Provisional application No. 60/358,573, filed on Feb. 15, 2002.

(51) Int. Cl.$^7$ ............................................. B62B 7/12
(52) U.S. Cl. ..................... 280/30; 280/648; 280/649; 297/6
(58) Field of Search ................... 280/30, 645, 650, 280/38, 40, 658, 647, 47.25, 643, 648, 47.4, 280/42, 652, 642, 47.18, 47.38, 649, 43.1, 280/37, 47.371; 297/6, 397

(56) References Cited

U.S. PATENT DOCUMENTS

| | | | | |
|---|---|---|---|---|
| 4,679,804 A | * | 7/1987 | Johnson | 280/30 |
| 4,828,281 A | * | 5/1989 | Sanchas | 280/30 |
| 4,872,693 A | * | 10/1989 | Kennel | 280/30 |
| 4,874,182 A | * | 10/1989 | Clark | 280/30 |
| 4,878,680 A | * | 11/1989 | Molnar | 280/30 |
| 4,902,026 A | * | 2/1990 | Maldonado | 280/30 |
| D310,054 S | | 8/1990 | Tucker et al. | |
| 4,989,888 A | * | 2/1991 | Qureshi et al. | 280/30 |
| 5,104,134 A | * | 4/1992 | Cone | 280/30 |
| 5,133,567 A | * | 7/1992 | Owens | 280/30 |
| 5,149,113 A | * | 9/1992 | Alldredge | 280/30 |
| 5,230,523 A | * | 7/1993 | Wilhelm | 280/30 |
| 5,318,311 A | | 6/1994 | Bofill | |
| 5,398,951 A | * | 3/1995 | Ryu | 280/30 |
| 5,403,022 A | * | 4/1995 | Snider | 280/30 |
| D358,058 S | | 5/1995 | Anthony et al. | |
| 5,595,393 A | * | 1/1997 | Batten | 280/30 |
| 5,707,106 A | * | 1/1998 | Clark | 297/130 |
| 5,823,547 A | * | 10/1998 | Otobe et al. | 280/30 |
| 5,829,770 A | | 11/1998 | Chiu | |
| 6,296,259 B1 | * | 10/2001 | Anderson | 280/30 |
| 6,357,784 B1 | * | 3/2002 | Mitzman | 280/642 |
| 6,367,821 B2 | * | 4/2002 | Thiele | 280/30 |
| 6,655,702 B2 | * | 12/2003 | Senger | 280/30 |
| 6,729,630 B2 | * | 5/2004 | Szmidt et al. | 280/47.25 |

* cited by examiner

*Primary Examiner*—J. Allen Shriver
(74) *Attorney, Agent, or Firm*—Gregory W. O'Connor; Dorsey & Whitney, LLP

(57) ABSTRACT

A wheeled car seat sized to hold an infant or young toddler in the seat of an automobile that can also be converted to a wheeled stroller is disclosed herein. The wheeled car seat is made from materials to protect the occupant while at the same time keeping the weight of the wheeled car seat to a minimum. When removing the wheeled car seat from an automobile, the user need not remove the child passenger while the user converts the wheeled car to a stroller, but instead only need lift the car seat above the ground and allow a pivotal chassis to swing open and expose wheels to the ground. When the wheeled car seat is configured as a car seat, the wheels are enclosed to prevent dirt from getting on the upholstery of the automobile.

28 Claims, 14 Drawing Sheets

WHEELED CAR SEAT

CROSS-REFERENCE TO RELATED APPLICATIONS

This application is a continuation-in-part of U.S. Design application Ser. No. 29/155,584, filed on Feb. 18, 2002 now U.S. Pat. No. D 471,727. This application also claims the benefit of U.S. Provisional Application No. 60/358,573, filed on Feb. 15, 2002. The above-identified applications are hereby incorporated by reference as if fully disclosed herein.

FIELD OF THE INVENTION

This invention relates to car seats, and more specifically relates to portable car seats sized to hold an infant or young toddler in the seat of an automobile that can also be converted to a wheeled stroller.

BACKGROUND OF THE INVENTION

Portable seats sized to hold an infant or young toddler in the passenger seat of an automobile, otherwise known as car seats, are well-known in the art. The purposes of these car seats is to protect the child and to properly position the child in the car seat for such protection. Car seats may also raise the level of the child slightly to allow a parent or guardian can administer to the child's needs more easily and perhaps to allow the child to see out of a car window. However, some car seats are bulky, lack versatility, and may not provide all the protection needed for the infant or child traveler.

SUMMARY OF THE INVENTION

The instant invention provides a light weight, versatile wheeled car seat that provides adequate protection for the passenger and can also be easily be converted to a stroller. The wheeled car seat is made from materials to protect the occupant while at the same time keeping the weight of the wheeled car seat to a minimum. When removing the wheeled car seat from an automobile, the user need not remove the child passenger while the user converts the wheeled car to a stroller. The user only need lift the car seat above the ground and allow a pivotal chassis to swing open and expose wheels to the ground, which also allows the user to convert the wheeled car seat from a car seat to a stroller without repositioning his or her hand and without losing grip. This feature eliminates the need for an adult to transport a stroller and a separate car seat in his or her car, thus saving precious trunk space. Also, the adult no longer has to disturb a youngster secured in a car seat by picking him up out of the car seat and placing him in a stroller. The wheeled car seat also employs an extendable handle so the user can push the wheeled car seat along the ground when it is in the stroller configuration. When the wheeled car seat is configured as a car seat, the wheels are enclosed to prevent dirt from getting on the upholstery of the automobile.

In one particular aspect of the present invention, a car seat capable of being converted to a stroller includes, a shell having a seat portion, a back portion, a side portion, and a bottom portion, a gripping surface, at least one wheel connected with the shell, and a pivotal chassis rotatably connected with the shell. The car seat can also include a mechanism for releasably holding the pivotal chassis in at least one position.

In another scenario of the present invention, a car seat capable of being converted to a stroller includes, a seat portion, a back portion, a first side portion, a second side portion, a rear portion, and a bottom portion, a gripping surface, at least one first wheel connected under the bottom portion, a pivotal chassis connected with an axle cylinder, wherein the axle cylinder is pivotally connected with the first side portion and the second side portion under the bottom portion, and at least one second wheel connected with the pivotal chassis. The car seat can also include a mechanism releasably engaging the axle cylinder to hold the pivotal chassis in at least one position.

In a further representation of the instant invention, a car seat capable of being converted to a stroller includes, a shell having a seat portion, a back portion, a first side portion, a second side portion, a rear portion, and a bottom portion, a gripping surface mounted on the first side portion and the second portion, at least a first wheel connected with the shell below the bottom portion, a pivotal chassis having a first arm and a second arm connected with a cross member, wherein the first arm and the second arm are connected with an axle cylinder and wherein the axle cylinder is pivotally connected with the first side portion and the second side portion, at least a second wheel connected with a bottom surface of the cross member, and a mechanism releasably engaging the axle cylinder to hold the pivotal chassis in a closed position wherein the bottom surface faces upward, an open position wherein the bottom surface faces downward, or an intermediate position.

The features, utilities, and advantages of various embodiments of the invention will be apparent from the following more particular description of embodiments of the invention as illustrated in the accompanying drawings and defined in the appended claims.

DETAILED DESCRIPTION OF THE INVENTION

Figure 1:
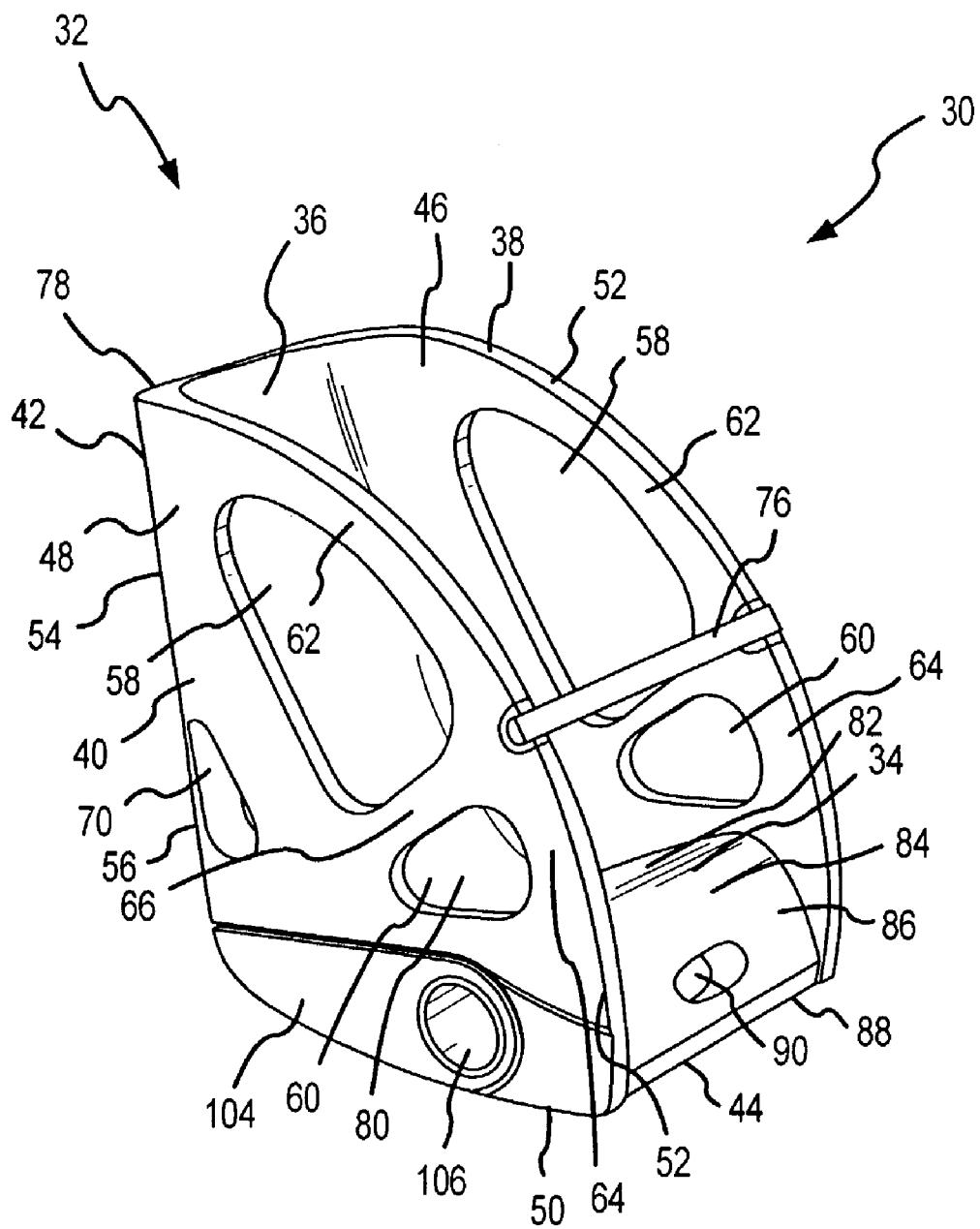
FIG. 1 is a front left-side perspective view of a wheeled car seat.
Figure 2:
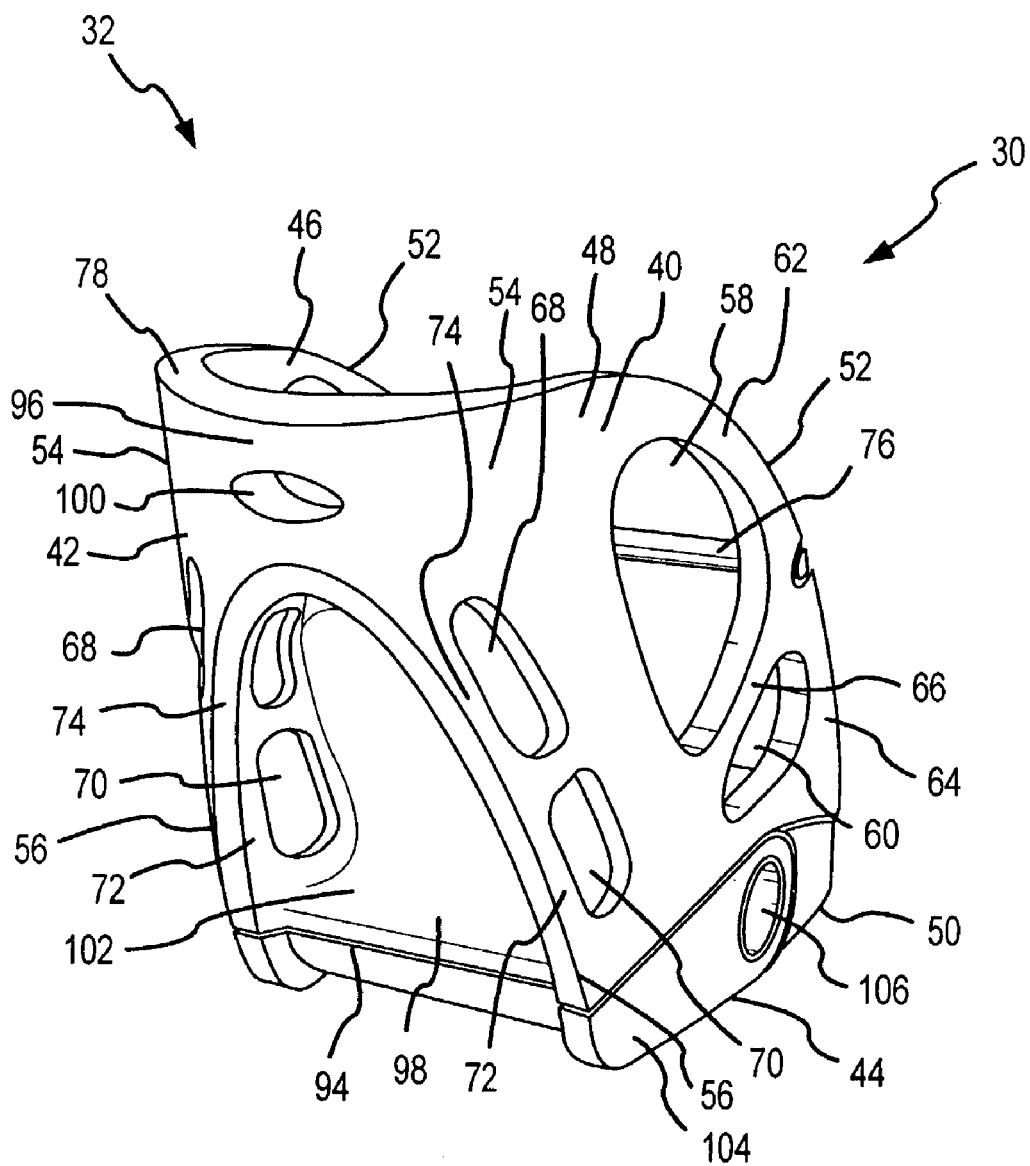
FIG. 2 is a rear left-side perspective view of the wheeled car seat in FIG. 1.

FIG. 1 shows a front left-side perspective view a wheeled car seat 30, and FIG. 2 shows a rear left-side perspective view of the wheeled car seat 30 in FIG. 1. The wheeled car seat depicted in FIGS. 1 and 2 is shown in a car seat configuration. As discussed in more detail below, the wheeled car seat 30 may be reconfigured to function as a stroller. The shape of the wheeled car seat 30 is defined by a shell 32. As shown in FIGS. 1 and 2, the shell includes a seat portion 34, a back portion 36, a right side portion 38, a left side portion 40, a rear portion 42, and a bottom portion 44. The right side portion 38 and the left side portion 40 are mirror images of each other. Typically, a child seated in the wheeled car seat 30 rests his or her bottom on the seat portion 34 and his or her back against the back portion 36. The right side portion 38 and the left side portion 40 of the shell provide side impact protection to a child passenger. When the child is seated in the wheeled car seat, the right side portion 38 and the left side portion 40 of the shell 32 will oftentimes be positioned adjacent the child's head, shoulder, and torso. In some instances, the side portions could absorb the impact from an exploding side door air bag or block flying glass and debris from striking the child passenger during an automobile accident.

As shown in FIGS. 1 and 2, the right side portion 38 and left side portion 40 each have an interior surface 46 and exterior surface 48 and are defined by a bottom edge 50, an arcuate front edge 52, a rounded rear corner 54, and a rear edge 56. The rounded rear corner 54 is defined by the intersection of the right side portion 38 or left side portion 40 and the rear portion 42 of the shell. The bottom edge 50 extends between the rear edge 56 and the arcuate front edge 52. The rear edge 56 extends upwardly from the bottom edge 50 to the rounded rear corner 54. The arcuate front edge 52 extends upwardly from the bottom edge 50 and curves toward the rear portion 42 of the shell 32 until it intersects with the rounded rear corner 54.

The shell 32 includes various openings or windows to allow a person to more easily grasp the wheeled car seat 30 when picking it up or maneuvering it into a desired position. Some of the openings or windows may also allow a child seated in the wheeled car seat to have a better view of his or her surroundings. For example, as shown in FIGS. 1 and 2, a front upper opening 58 and a front lower opening 60 are located in the right side portion 38 and left side portion 40 of the shell. A first gripping area 62 is defined where the perimeter of the front upper opening 58 is nearest the arcuate front edge 52. A second gripping area 64 is defined where the perimeter of the front lower opening 60 is nearest the arcuate front edge 52. A third gripping area 66 is defined where the perimeter of the front upper opening 58 is nearest the perimeter of the front lower opening 60. A person desiring to lift or maneuver the wheeled car seat 30 in an awkward environment, such as the back seat of an automobile, may find these numerous gripping areas useful.

Other openings may be located in the right side portion 38 and left side portion 40 to create additional gripping areas. For example, as shown in FIG. 2, a rear upper opening 68 and a rear lower opening 70 are located in the ride side portion 38 and left side portion 40 of the shell 32. A fourth gripping area 72 is defined where the perimeter of the rear lower opening 70 is nearest the rear edge 56. A fifth gripping area 74 is defined where the perimeter of the rear upper opening 68 is nearest the rear edge 56. It should be understood that the present invention may include more or less openings in the shell 32 with different shapes and sizes, and is not limited to what is depicted herein. However, the windows or openings should be located near one another or to the edges of the shell, so that the structural integrity of the of wheeled car seat 30 is sufficient to support being grasped. The stronger the shell material, the closer the openings can be to one another and to the edges.

As shown in FIGS. 1 and 2, the wheeled car seat also includes an extendable handle mechanism 76. The extendable handle mechanism 76 can be configured in a retracted position when the wheeled car seat is in the car seat configuration. The handle mechanism can also help to reinforce the structure of the wheeled car seat when the extendable handle mechanism 76 is in the retracted position. FIGS. 1 and 2 show the extendable handle mechanism in the retracted position. Alternatively, the extendable handle mechanism can be configured in an extended position when the wheeled car seat is in the stroller configuration, as is discussed in more detail below.

As shown in FIGS. 1 and 2, the back portion 36 of the shell is generally defined by a surface area between an upper arcuate edge 78 and a rounded seat corner 80. The upper arcuate edge 78 extends between the arcuate front edges 52 of the left side portion 40 and right side portion 38. The rounded seat corner 80 extends between the interior surfaces 46 of the right side portion 38 and the left side portion 40 and is defined by the intersection of the back portion 36 and the seat portion 34 of the shell 32. The seat portion 34 is defined by a rear seat portion 82 of the shell 32 between right side portion 38 and the left side portion 40 extending forward from the back portion 36 and sloping upward to a bend area 84. From the bend area 84, the seat portion 34 is further defined by a front seat portion 86 as the seat portion 34 extends forward and curves downward to an intersection of the front arcuate edges 52 and bottom edges 50 of the right side portion 38 and left side portion 40. A front bottom edge 88 extends between the bottom edges 50 of the right side portion 38 and the left side portion 40 adjacent the front seat portion 86. A detent hand slot 90 may also be located in the front seat portion 86, as shown in FIG. 1. The detent hand slot 90 serves as an additional gripping area as well as access to a detent 92 (not shown in FIGS. 1–2) discussed in more detail below.

The rear portion 42 of the shell 32 is generally defined by an area surrounded by a rear bottom edge 94, the rounded rear corners 54, the rear edges 56 of the right side portion 38 and the left side portion 40, and the upper arcuate edge 78. As shown in FIG. 2, the rounded rear corners 54 extend downward from the upper arcuate edge 78 to the rear edges 56 of the right side portion 38 and the left side portion 40.

The rear edges 56 of the right side portion 38 and the left side portion 40 extend downward from the rounded rear corners 54 to the bottom edges 50 of the right and left side portions. The rear bottom edge 94 extends between the bottom edges 50 of the right side portion 38 and the left side portion 40 adjacent the rear portion 42 of the shell 32. The rear portion 42 also defines an upper rear portion 96 and a lower rear portion 98. As shown in FIG. 2, a rear gripping slot 100 is located in the upper rear portion 96. The lower rear portion 98 can also form a storage compartment 102 that can be closed by any suitable means such as a flap or an elastic cord net stretched across the lower rear portion 98 and secured to the right side portion 38 and the left side portion 40.

The bottom portion 44 of the shell 32 is generally defined by a surface area underneath the seat portion 34. As shown in FIGS. 1 and 2, a pivotal chassis 104 is mounted to the shell 32 by an axle cylinder 106 extending between the right side portion 38 and the left side portion 40 and the bottom portion 44. The pivotal chassis 104 is discussed in greater detail below.

Figure 3:
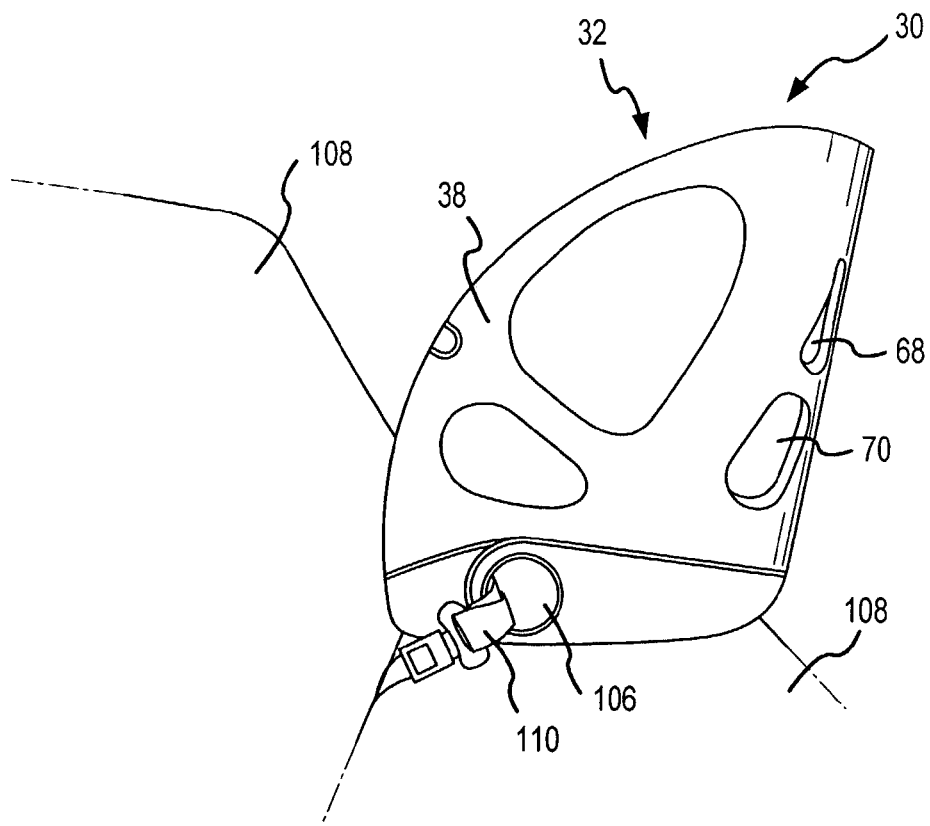
FIG. 3 is a right-side view the wheeled car seat depicted in FIGS. 1 and 2 in an automobile with a seatbelt holding the wheeled car seat in a position such that a child passenger would be facing the rear of the automobile.
Figure 4:
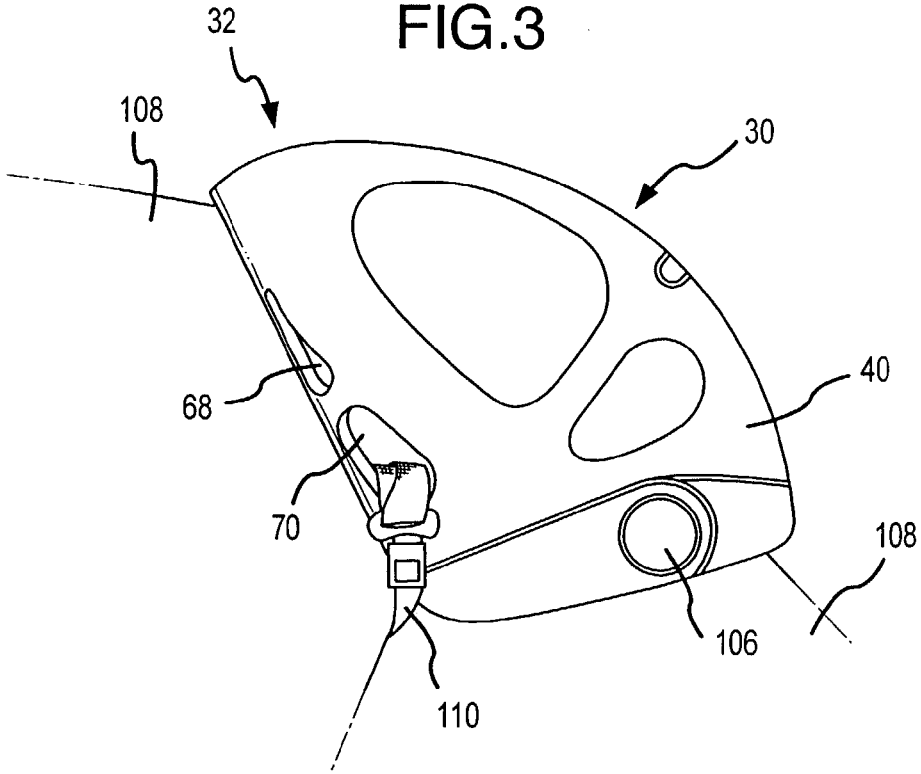
FIG. 4 is a left-side view the wheeled car seat depicted in FIGS. 1 and 2 in an automobile with a seatbelt holding the wheeled car seat in a position such that a child passenger would be facing the front of the automobile.

FIGS. 3 and 4 show the wheeled car seat 30 configured as a car seat and secured in an automobile. In particular, FIG. 3 shows the wheeled car seat 30 secured to a rear seat 108 of the automobile by passing a seat belt 110 through the middle of the axle cylinder 106 such that a child seated in the wheeled car seat 30 would be facing the rear of the automobile. FIG. 4 shows the wheeled car seat 30 secured to the rear seat 108 of the automobile by passing the seat belt 110 through the lower rear opening 70 on the right side portion 38 of the shell 32 along the rear potion and exiting the lower rear opening 70 on the left side portion 40 of the shell such that a child seated in the wheeled car seat 30 would be facing the front of the automobile. Depending on the configuration of a particular seat belt, the shoulder harness of the seat belt could also pass through the upper rear opening 68 on one side of the wheeled car seat 30 and the lower rear opening 70 on the opposite side of the wheeled car seat 30.

The wheeled car seat 30 may be constructed utilizing available technology to enhance the strength of the seat in order to protect the child passenger while at the same time providing a comfortable riding environment. For example, the wheeled car seat may be manufactured by utilizing similar techniques used in the manufacture of lightweight sports helmets, such as bicycle helmets. As is well known, bicycle helmets are made with essentially three layers. An outer most layer is a thin vacuum formed shell usually made from a high strength and lightweight plastic material such as polycarbonate or PET vacuum formable materials. A center layer or core of these materials typically comprises expanded polystyrene or other rigid but crushable cushioning materials. The core is usually attached to the shell using adhesives or hook and loop fasteners. A third layer, the inner most portion of bicycle helmets, comprises isolated textile pads which are held in strategic positions on the inside of the expanded polystyrene core with hook and loop fasteners.

Similarly, the present invention may employ many of these known helmet technologies by constructing the wheeled car seat using a strong, flexible, crushable, resilient layered approach. The shell 32, as shown in FIGS. 1 and 2, would comprise one or more vacuumed formed shell portions, which are assembled together using adhesives. In an alternative configuration, the axle cylinder 106 could hold two half-shelled portions together. The shell can be made utilizing various manufacturing techniques known in the art, such as injection-molding, blow-molding with a foam filled hollow core, and rotational molding. Immediately within the shell 32 would be a rigidifying and impact absorbing expanded plastic layer or core. While not shown, textile upholstery sections and cushioning sections for the seat portion and back portion of the wheeled car seat would be releasably attached using adhesives or hook and loop fasteners, and the like to the wheeled car seat. Because the cushioning sections would be releasably attached, they could be removed for cleaning or replaced when worn out without the having to replace the entire wheeled car seat. The strength of the shell material would help protect a child passenger in the event of an automobile accident, while at the same time providing a light weight design that can more easily be lifted or maneuvered.

The present invention could also utilize its own harness or seat belt restraint to better secure the child passenger to the wheeled car seat. For example, a car seat restraint could be equipped with a releasable buckle, similar to a standard automobile seat belt buckle as is known in the art, attached to a lower belt that is connectable to an upper harness. The lower belt could be affixed to the seat portion of the shell. The upper harness could be affixed to the back portion of the shell and includes a left strap and a right strap. The child passenger is secured to the wheeled car seat using the car seat restraint by passing the lower belt upward between the child passenger's legs and then buckling it to the upper harness after the left strap and right strap have been lowered across the child passenger's shoulders. Other car seat restraint configurations could include a waist strap secured to the back portion or seat portion of the shell that buckles across the child passenger's waist.

Figure 5A:
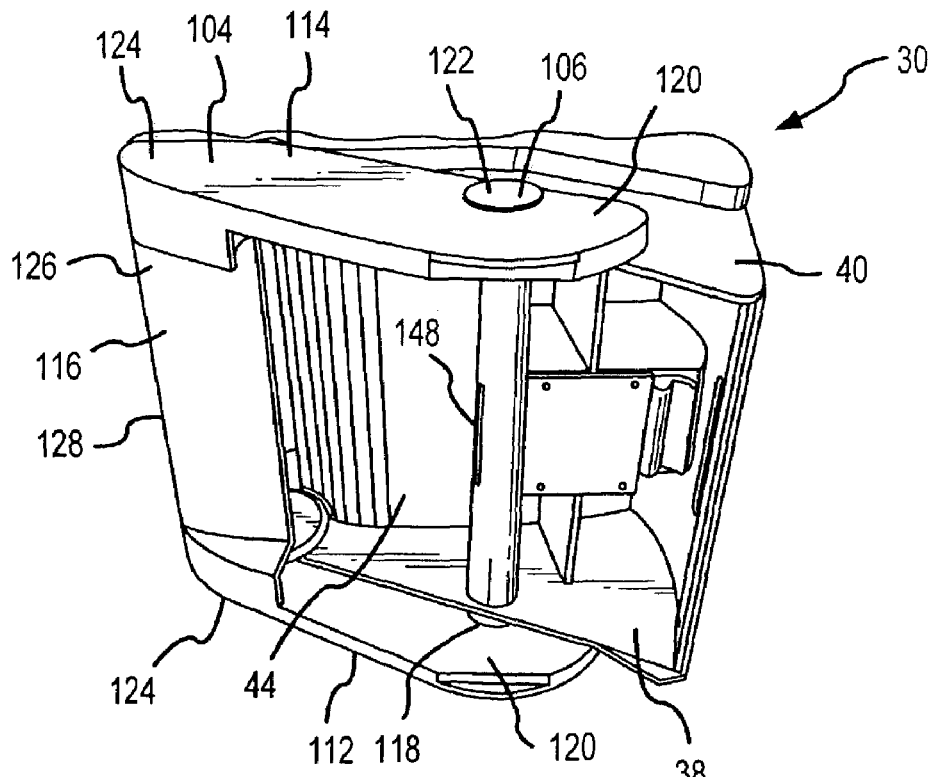
FIG. 5A is a bottom left-side perspective sectional view of the wheeled car seat configured as a car seat.

FIG. 5A is a bottom left-side perspective sectional view of the wheeled car seat 30 configured as a car seat. The pivotal chassis 104 includes a right pivot arm 112, a left pivot arm 114, and a cross member 116. As previously discussed, the pivotal chassis 104 is connected to the shell 32 by an axle cylinder 106 extending between the right side portion 38 and the left side portion 40 under the bottom portion 44. In particular, a first end 118 of the axle cylinder 106 penetrates the right side portion 38 and connects with a pivot area 120 of the right pivot arm 112. Similarly, a second end 122 of the axle cylinder 106 penetrates the left side portion 40 and connects with the pivot area 120 of the left pivot arm 114. Therefore, the axle cylinder rotates 106 with the pivotal chassis 104. The cross member 116 extends between and is connected with the left pivot arm 114 and the right pivot arm 112 at a swing area 124 located on each pivot arm. As shown in FIG. 5A, the cross member 116 also has an upper surface 126 and a lower surface 128. In an alternative configuration, the pivotal chassis could be secured to holes on the right side portion and the left side portion with a separate brace passing between the right and left side portions under the bottom portion of the shell.

Figure 5B:
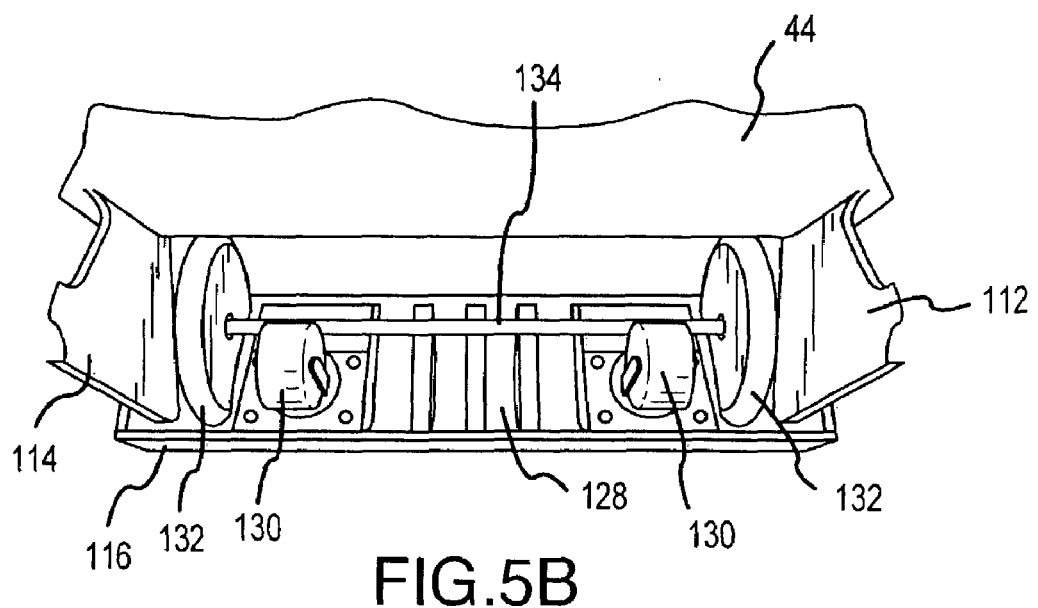
FIG. 5B is a front view of a lower surface of a cross member of a pivotal chassis when the wheeled car seat is configured as a car seat.

FIG. 5B shows a front view of the lower surface 128 of the cross member 116 of the pivotal chassis 104 when the wheeled car seat 30 is configured as a car seat. As show in FIG. 5B, two cross member wheels 130 are mounted on the lower surface 128 of the cross member 116 of the pivotal chassis 104. Two seat wheels 132 are mounted on a wheel axle 134 extending between the right side portion 38 and the left side portion 40 under the rear portion 44 of the shell 32. When the wheeled car seat 30 is configured as a car seat, the cross member wheels 130 extend upwardly toward the bottom portion 44 of the wheeled car seat such that the cross member wheels 130 and seat wheels 132 are enclosed between the bottom portion 44 of the wheeled car seat and the lower surface 128 of the cross member 116. This helps to prevent dirt from rubbing off the wheels and onto the upholstery of the automobile. As shown in FIG. 5B, the cross member wheels 130 are caster wheels, and the seat wheels 132 are fixed axis wheels with larger diameters. It should be understood that alternative wheel configurations may be used with different numbers, designs, and diameters, and the invention is not limited to what is depicted herein. For example, the wheels may be fixed axis or caster design, and a single wide roller or wheel could be used instead of a plurality of wheels. The cross member wheels 130 are mounted on the cross member 116 and spaced apart such that they do not interfere with the seat wheels 132 when the wheeled car seat 30 is configured as a car seat.

Figure 5C:
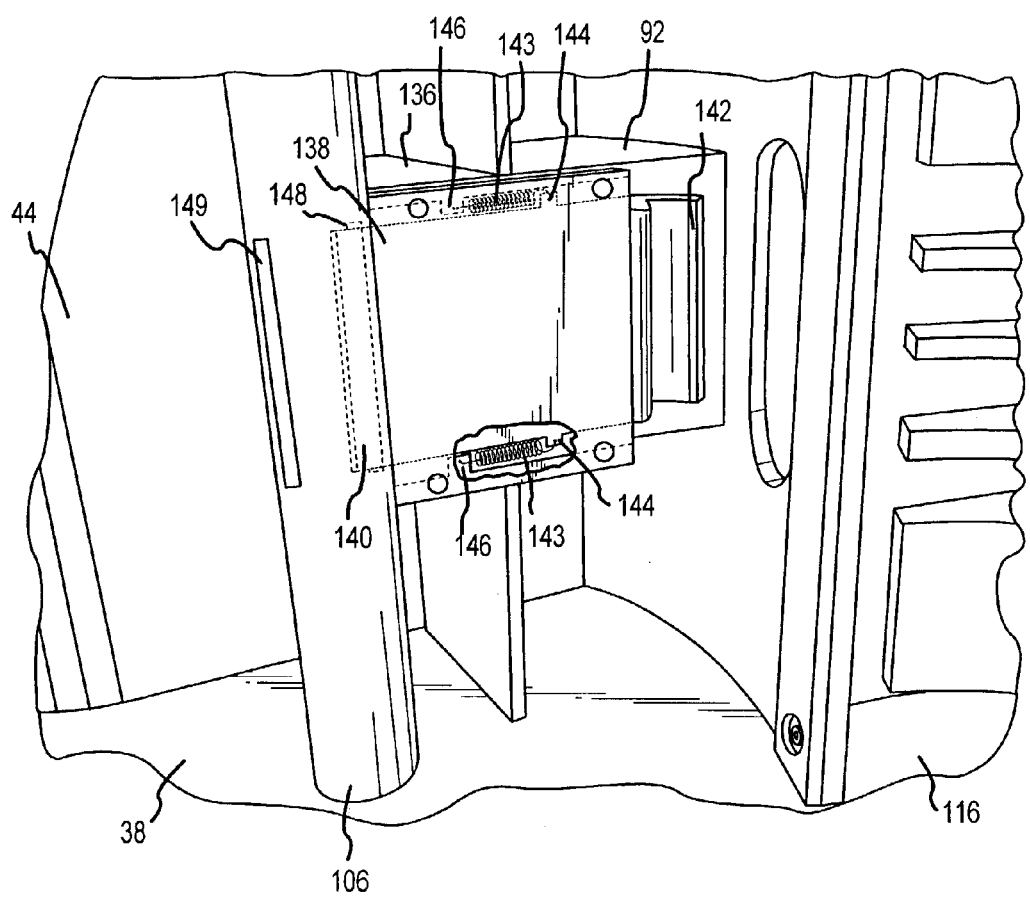
FIG. 5C is a sectional bottom view of the wheeled car seat configured as a stroller detailing a detent.

FIG. 5C is a detailed sectional bottom view of the wheeled car seat 30 configured as a stroller detailing the detent 92 used to hold the pivotal chassis 104 in closed and open positions. The detent 92 is comprised of a housing 136 attached to the bottom portion 44 of the shell 32. The housing 136 maintains a sliding plate 138 with an engaging portion 140 and a handle portion 142. As shown in FIG. 5C, springs 143 are attached to plate tabs 144 extending from the sliding plate 138 and to housing tabs 146 attached to the housing 136 such that a force exerted by the springs 143 operates to continuously pull the sliding plate 138 in a rearward direction toward the axle cylinder 106. Therefore, the engaging portion 140 of the sliding plate 138 is continuously forced against the axle cylinder 106 by the springs 143.

As shown in FIG. 5C, a first slot 148 and a second slot 149 are located on the axle cylinder 106 and are spaced approximately 180° apart. When the wheeled car seat 30 is configured as a car seat, the pivotal chassis 104 is in the closed position. Conversely, when the wheeled car seat 30 is configured as a stroller, the pivotal chassis 104 is in the open position. Therefore, when the engaging portion 140 of the sliding plate 138 engages the second slot 149, the pivotal chassis 104 is held in the closed position, as shown in FIG. 5A. When the engaging portion 140 of the sliding plate 138 engages the first slot 148, the pivotal chassis 104 is held in the open position, as shown in FIG. 5C. When the engaging portion 140 of the sliding plate 138 is not engaged in either slot, the pivotal chassis 104 is free to pivot, and the axle cylinder 106 is the center of rotation about which the pivotal chassis 104 rotates. Because the pivotal chassis 104 is connected with the axle cylinder 106, the axle cylinder rotates together with the pivotal chassis 104. As the pivotal chassis 104 and axle cylinder 106 rotate from one position to another, the engaging portion 140 of the sliding plate 138 is continuously pulled against the axle cylinder until the engaging portion 140 is aligned with either the first slot 148 or the second slot 149. Once the engaging portion 140 of the sliding plate 138 is aligned with either the first slot 148 or the second slot 149, the force exerted on the sliding plate 138 by the springs 143 pulls the engaging portion 140 into the slot, thus locking the axle cylinder 106 and pivotal chassis 104 into either the open position or closed position. It should be understood that the present invention is not limited to the detent design depicted and described herein. Other mechanisms could be employed to hold the pivotal chassis 104 in the open and closed positions without the need for the axle cylinder, while allowing rotation between these positions, such as a ratchet mechanism or releasable clasps that directly engage the right pivot arm 112 and the left pivot arm 114, a rotating detent, and the like. In alternative embodiments of the present invention, no mechanism is utilized to hold the pivotal chassis in various positions. Instead, the pivotal chassis is allowed to pivot freely.

Figure 6A:
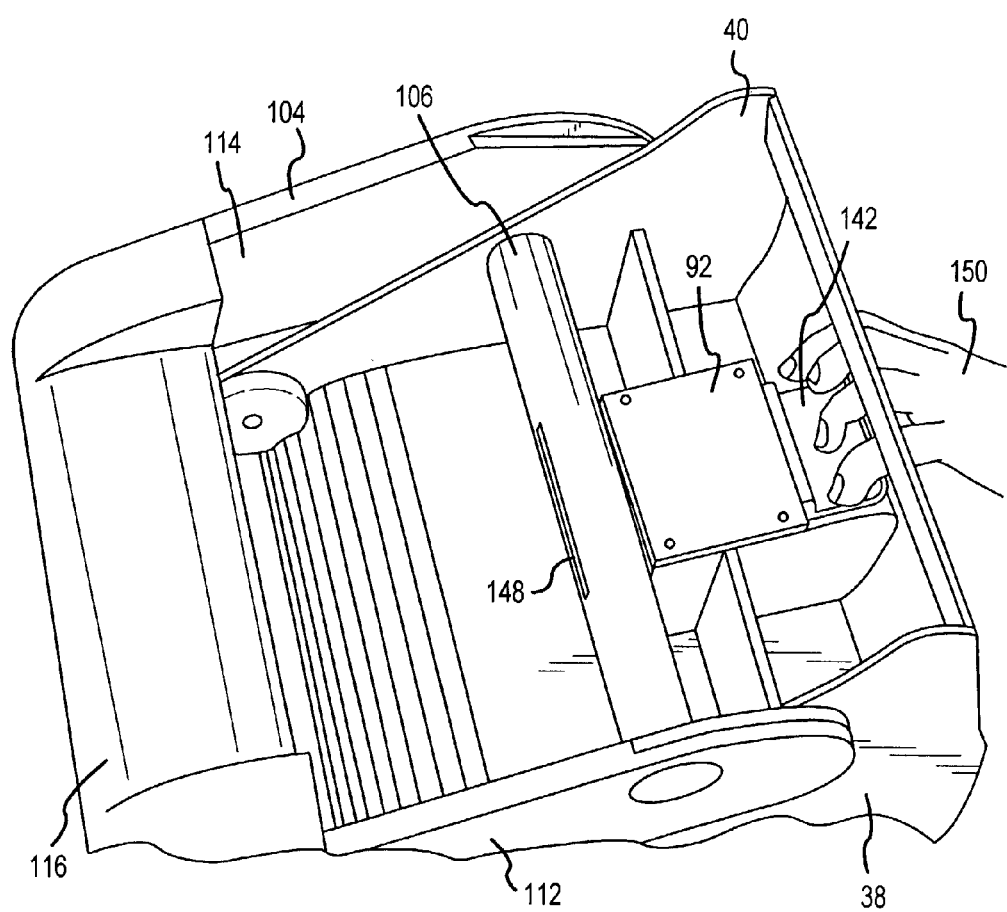
FIG. 6A is a bottom right-side perspective sectional view of the wheeled car seat showing how a user actuates the detent.
Figure 6B:
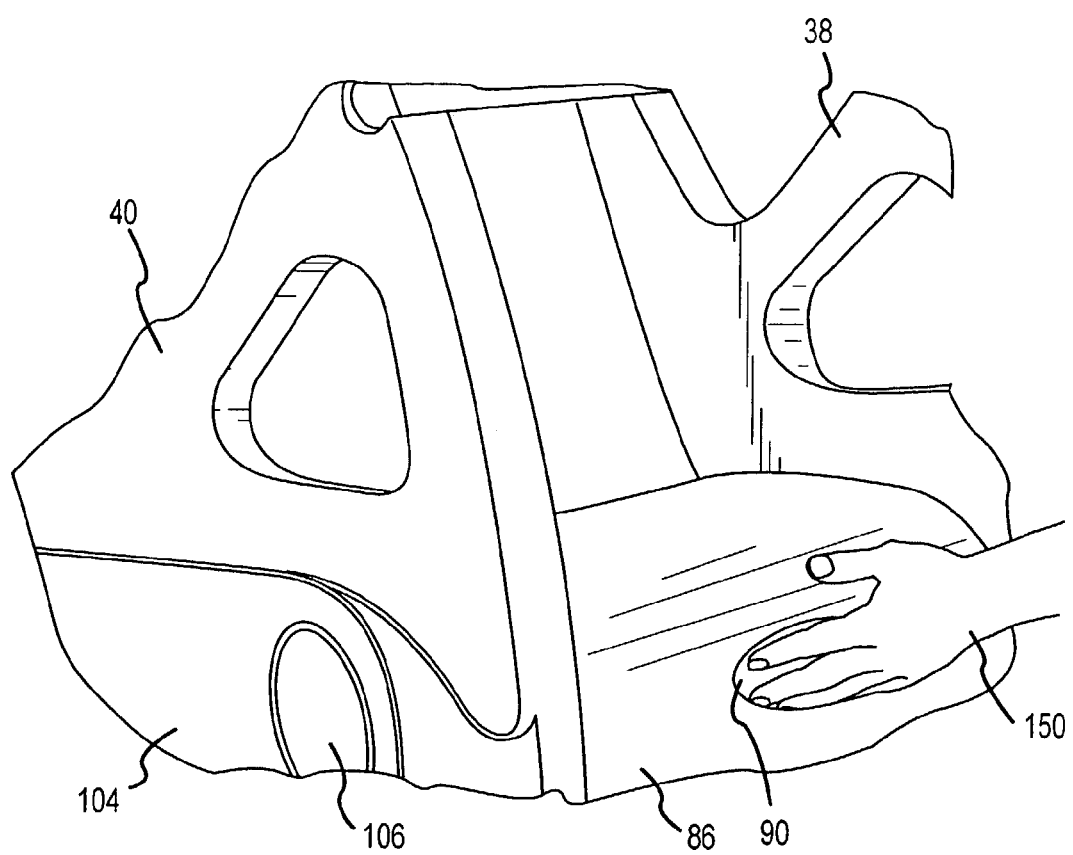
FIG. 6B a front left-side perspective sectional view of the wheeled car seat showing a user's hand reaching through a detent hand slot.

When a user wishes to convert the wheel car seat 30 from the car seat configuration to the stroller configuration, the user grasps the handle portion 142 of the sliding plate 138 of the detent 92 and pulls it in a forward direction until the engaging portion 140 of the sliding plate 138 is disengaged from the second slot 149 in the axle cylinder 106, as shown in FIG. 6A. As shown in FIG. 6B, a user's hand 150 reaches the handle portion 142 of the sliding plate 138 of the detent 92 from outside of the wheeled car seat 30 through the detent hand slot 90 located in the front seat portion 86.

Figure 7A:
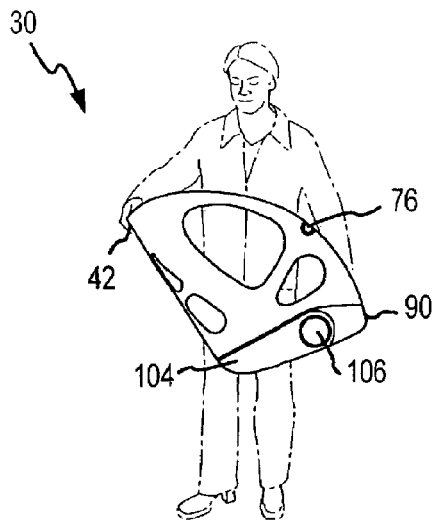
FIGS. 7A–7C show the wheeled car seat being transformed from a car seat configuration to a stroller configuration.
Figure 7B:
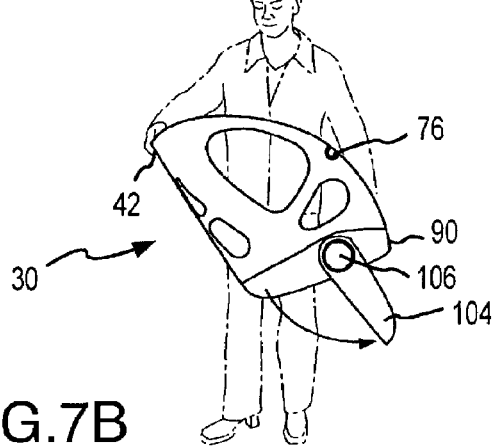
Figure 7C:
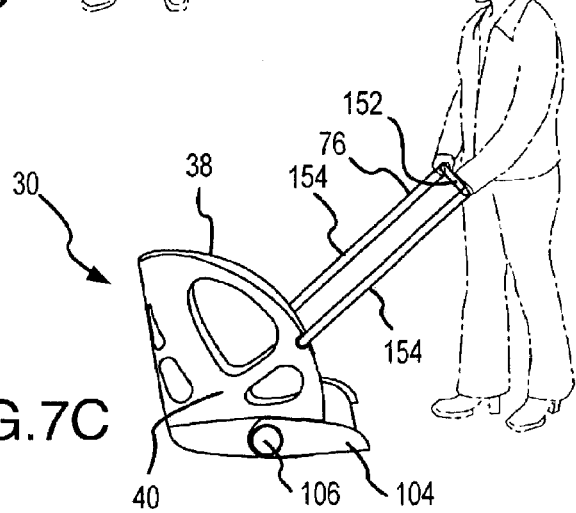

FIGS. 7A–7C show one method of how a user can transform the wheeled car seat 30 from the car seat configuration to the stroller configuration. In FIG. 7A, a user is holding the wheeled car seat 30 above the ground by grasping the rear gripping slot 42 with her right hand and gripping the detent hand slot 90 with her left hand. Once the user grasps the handle portion 142 of the sliding plate 138 and pulls it forward until the engaging portion 140 of the sliding plate 138 is disengaged from the second slot 149, the pivotal chassis 104 is free to rotate with the axle cylinder 106 in a counter-clockwise direction, as shown in FIG. 7B. The user then places the wheeled car seat 30 on the ground, forcing the pivotal chassis 104 to rotate further until the engaging portion 140 of the sliding plate 138 engages the first slot 148 in the axle cylinder 106, as shown in FIG. 7C. The user then places the extendable handle mechanism 76 in the extended position, thus completing the reconfiguration of the wheeled car seat 30 to the stroller configuration.

As shown in FIG. 7C, the extendable handle mechanism 76 comprises a handle 152 attached to extendable handle support posts 154. The handle support posts 154 can be configured to telescopically extend and retract. FIG. 7C shows the extendable handle mechanism 76 in an extended position, and FIGS. 7A and 7B show the extendable handle mechanism 76 in a retracted position. When the extendable handle mechanism 76 is in the retracted position, the handle support posts 154 are stored within the right side portion 38 and the left side portion 40 of the shell 32. The extendable handle mechanism 76 may be locked in the retracted position by a handle latching mechanism as is common in the art. Locking the extendable handle mechanism 76 in retracted position allows a user to grasp the handle 152 when lifting the wheeled car seat 30. When a user configures the wheeled car seat 30 to the stroller configuration, the user grasps the handle 152 and pulls the extendable handle mechanism 76 from its retracted position to its extended position. In an another embodiment, the handle support posts can be configured to pivot around the wheeled car seat such that the user can push the wheeled car seat either from behind or in front of the wheeled car seat.

Figure 8:
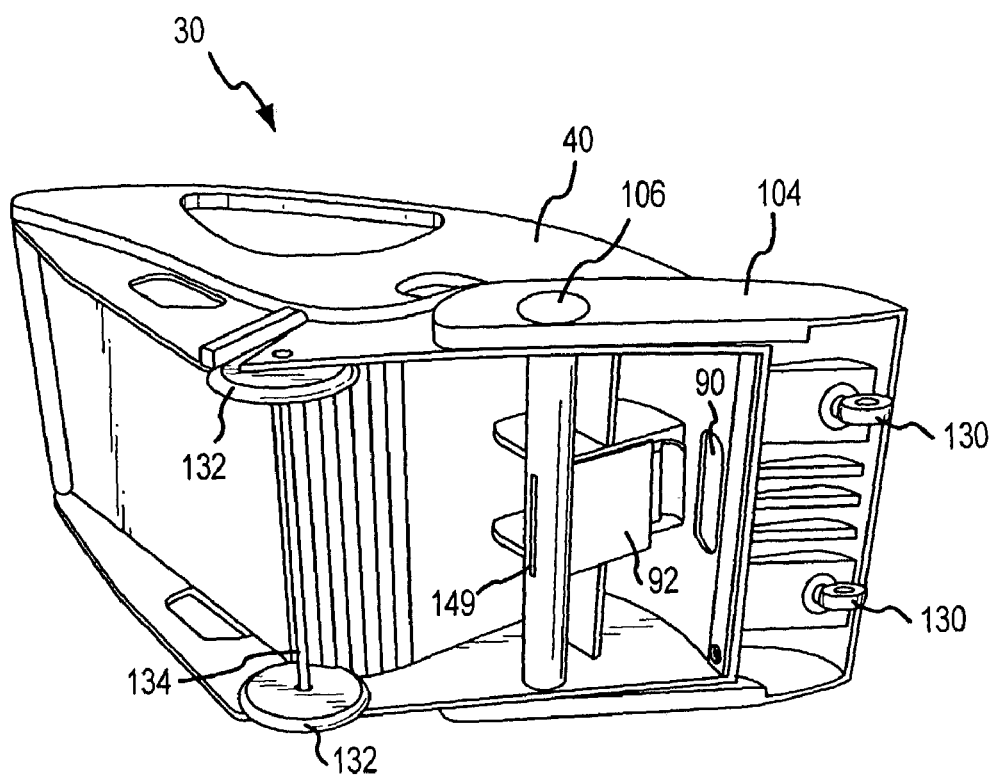
FIG. 8 is a bottom view of the wheeled car seat in the stroller configuration.

FIG. 8 shows a bottom left-side perspective view of the wheeled car seat 30 in the stroller configuration. When the wheeled car seat 30 is in the stroller configuration, the wheeled car seat 30 is supported on the ground by the cross member wheels 130 and the seat wheels 132. As shown in FIG. 8, the cross member wheels 130 are caster wheels that add to the maneuverability of the wheeled car seat 30. A user is able to push on the handle 152 of the wheeled car seat and steer by manipulating the direction of the cross member wheels 130 as the wheeled car seat 30 rolls along the ground. Other embodiments of the present invention can utilize seat wheels 132 that are caster wheels and cross member wheels 130 that are fixed axis designs. As previously discussed, a single wide roller or wheel could also be used instead of a plurality of wheels. Embodiments of the present invention may also employ a design where the rear portion 42 of the wheeled car seat presents a rounded, prow like configuration, as shown in FIG. 2. This prow like configuration enhances the ability of a user to aim the wheeled car seat through crowded urban walkways when the wheeled car seat 30 is configured as a stroller.

Reconfiguring the wheeled car seat 30 to the car seat configuration from the stroller configuration works in an opposite manner as previously described with reference to FIGS. 7A–7C. The user places the extendable handle mechanism 76 in the retracted position, and holds the wheeled car seat 30 above the ground by grasping the rear gripping slot 42 with her right hand and gripping the detent hand slot 90 with her left hand. The user then grasps the handle portion 142 of the sliding plate 138 and pulls it forward until the engaging portion 140 of the sliding plate 138 is disengaged from the first slot 148, allowing the pivotal chassis 104 to rotate in a clockwise direction, opposite of FIG. 7B. The user then places the wheeled car seat 30 on a surface, such as a seat in an automobile, so that the pivotal chassis 104 is forced to rotate until the engaging portion 140 of the sliding plate 138 engages the second slot 149 in the axle cylinder 106, completing the reconfiguration of the wheeled car seat 30 to the car seat configuration. As shown in FIGS. 5A and 5B, the wheels are encased between the bottom portion 44 of the shell 32 and the lower surface 128 of the cross member 116 when the wheeled car seat 30 is in the car seat configuration. This helps to keep automobile seats relatively clean, because it is difficult for dirt accumulated on the wheels to rub off on the upholstery.

Figure 9A:
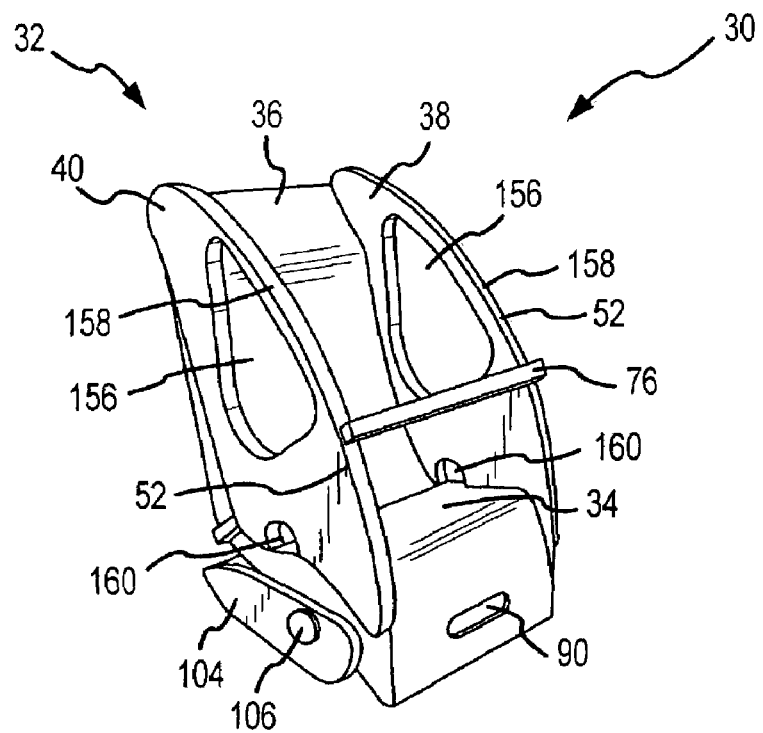
FIG. 9A is a front left-side perspective view of a second embodiment of the wheeled car seat in the car seat configuration.
Figure 9B:
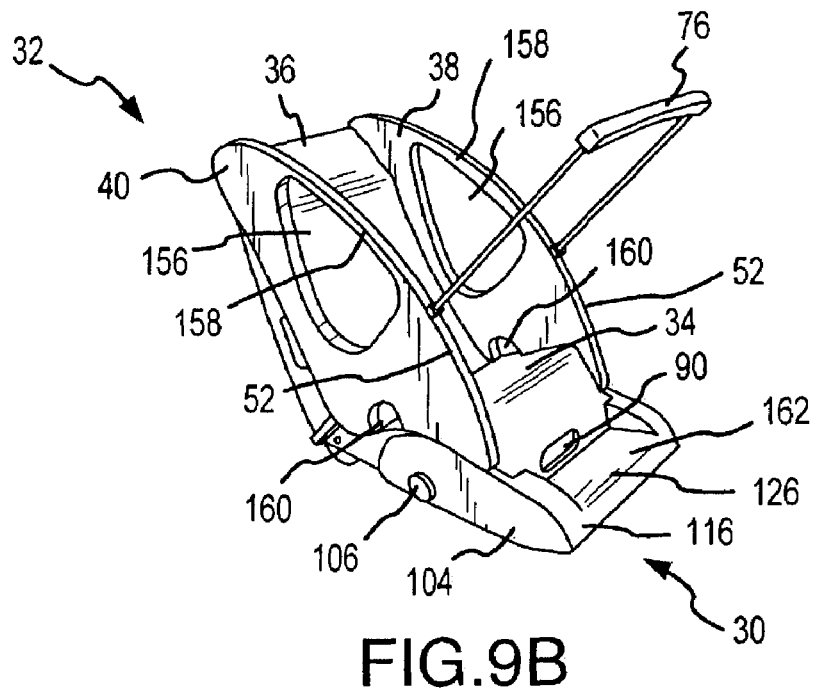
FIG. 9B is a front left-side perspective view of the second embodiment of the wheeled car seat in the stroller configuration.

FIGS. 9A and 9B show a second embodiment of the present invention describing an alternative shell configuration and cross member design. Conversion of the wheeled car seat 30 depicted in FIGS. 9A and 9B from the car seat configuration to the stroller configuration works in substantially the same way as has been previously described. As shown in FIGS. 9A and 9B, the shell 32 of the wheeled car seat 30 has a single large opening 156 located in the left side portion 40 and one located in the right side portion 38. A long gripping area 158 is defined where the perimeter of the large opening 156 is nearest the arcuate front edge 52 of the right side portion 38 and the left side portion 40. A small opening 160 is located in the right side portion 38 and the left side portion 40 in a location near the intersection of the seat portion 34 and the back portion 36. As shown in FIG. 9B, a foot rest 162 is located on upper surface 126 of the cross member 116 of the pivotal chassis 104. When the wheeled car seat 30 is in the stroller configuration, a child passenger can rest his or her feet on the foot rest which can help prevent the child's feet from dragging on the ground.

Figure 10:
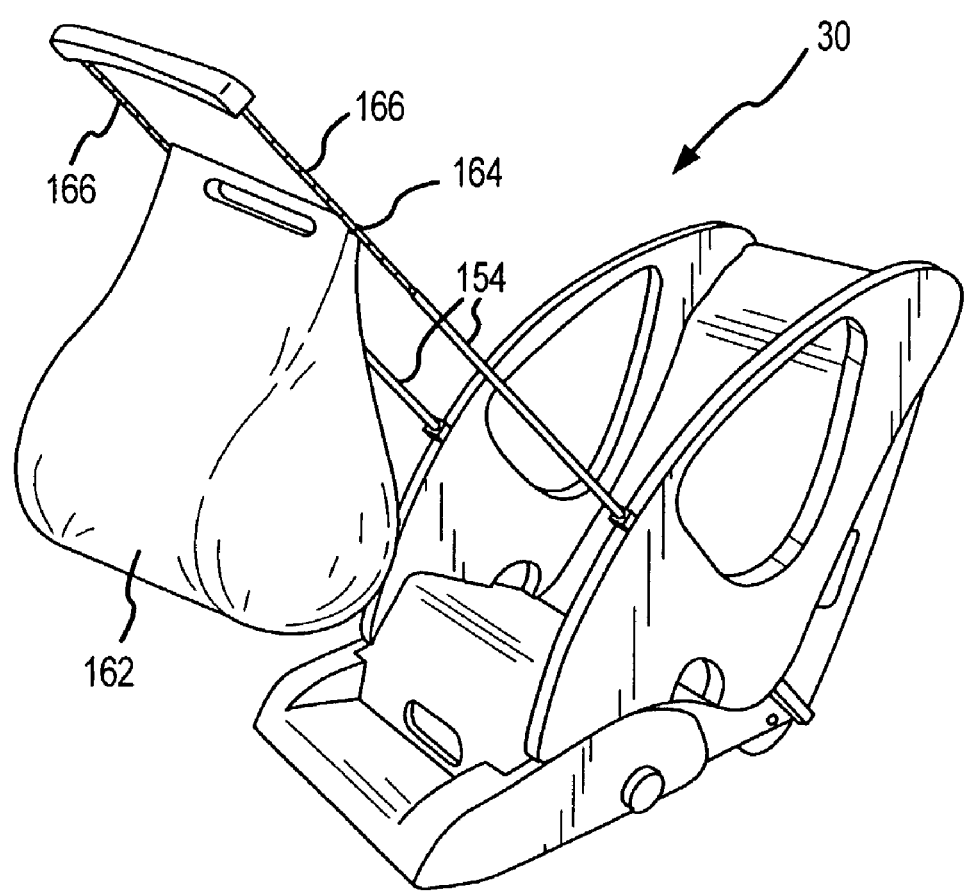
FIG. 10 is a rear right-side perspective view of the wheeled car seat in the stroller configuration with a removable tote.

As shown in FIG. 10, the wheeled car seat 30 can be equipped with a removable tote 162. The removable tote 162 is configured to be removably attached to the handle support posts 154 of the extendable handle mechanism 76. The removable tote 162 depicted in FIG. 10 is sized to fit between the handle support posts 154. The removable tote 162 can be attached to and hang below the handle support posts 154 by any known means. In FIG. 10, the removable tote 162 is attached to the wheeled car seat 30 by spring loaded pins 164 that protrude from the removable tote 162 through pin holes 166 located in the handle supports 154. The removable tote 162 shown in FIG. 10 is conveniently positioned between the user and child passenger at a comfortable access level, and can be used for carrying baby accessories and the like when the wheeled car seat 30 is in the stroller configuration. It should be understood that the removable tote could be secured in different ways and in other locations on the wheeled car seat, and is not limited to what is depicted herein. For example, the removable tote could be attached to the rear portion of the wheeled car seat using hook and loop fasteners. The removability of the tote allows the user to separate the weight of any bagged accessories from the wheeled car seat when lifting or maneuvering the wheeled car seat.

Figure 11A:
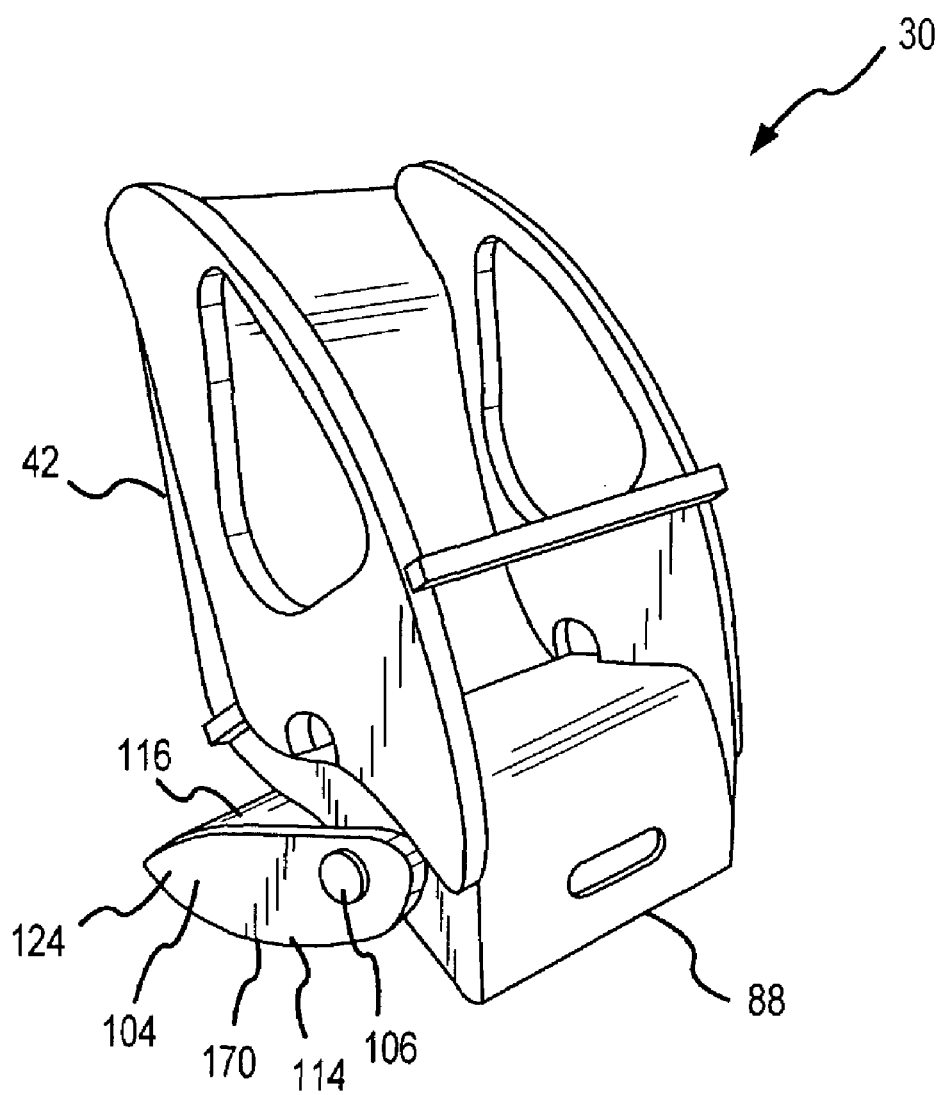
FIG. 11A is a front left-side perspective view of the wheeled car seat in a booster seat configuration.
Figure 11B:
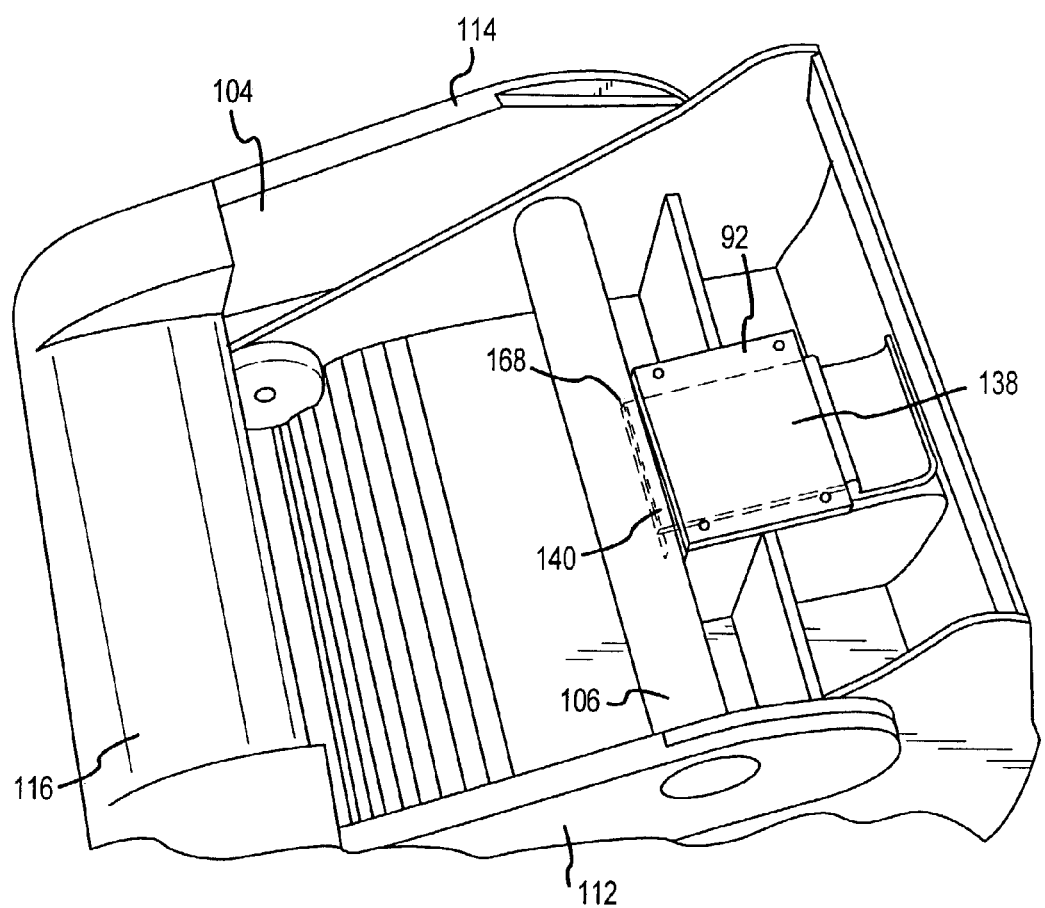
FIG. 11B is a bottom view of the wheeled car seat showing an intermediate slot located in the axle cylinder.

Embodiments of the wheeled car seat may also utilize other various shell and pivotal chassis designs so that the wheeled car seat could be employed for additional uses. For example, the wheeled car seat could be designed such that it could be used as a child's booster seat, as shown in FIG. 11A. When the wheeled car seat 30 is in the booster seat configuration, the pivotal chassis 104 is positioned in an intermediate position such that the rear portion 42 of the wheeled car seat 30 is elevated from the surface upon which it is resting. As shown in FIG. 11A, the wheeled car seat is supported by the front bottom edge 88 and the pivotal chassis 104. In particular, support from the pivotal chassis 104 comes from the swing areas 124 of the right pivot arm 112 and the left pivot arm 114 along with the cross member 116. As shown in FIG. 11B, an intermediate slot 168 is located in the axle cylinder 106. When the engaging portion 140 of the sliding plate 138 engages the intermediate slot 168, the pivotal chassis 104 is held in position such that the wheeled car seat 30 is secured in the booster seat configuration.

The bottom view of the embodiment of the wheeled car seat shown in FIG. 11B illustrates only one intermediate slot 168 located in the axle cylinder 106. In addition, the detent 92 depicted in FIG. 11B is not spring loaded. Therefore, a user need not manipulate the detent 92 when converting the wheeled car seat from the car seat configuration to the stroller configuration and back again. In this configuration, the pivotal chassis 104 is free to rotate as previously discussed with reference to FIGS. 7A to 7C when the user lifts the wheeled car seat 30 above the ground. In another embodiments, the present invention could be configured with the first slot 148, the second slot 149, and the intermediate slot 168 located in the axle cylinder 106. Depending on the desired functionality, the detent may or may not be spring loaded. In other embodiments, a plurality of intermediate slots could be located in the axle cylinder at various locations around its circumference, giving the user several choices of positions and elevations in which to place the wheeled car seat.

As shown in FIG. 11A, the right pivot arm 112 and left pivot arm 114 of the pivotal chassis 104 could also define a curved rocking surface 170. This feature would allow the wheeled car seat 30 to rock back and forth on the curved rocking surface 170 when the wheeled car seat 30 is placed in the car seat configuration. Therefore, a person could rock a child seated in the wheeled car seat or the child seated in the wheeled car seat could rock the seat.

Figure 12:
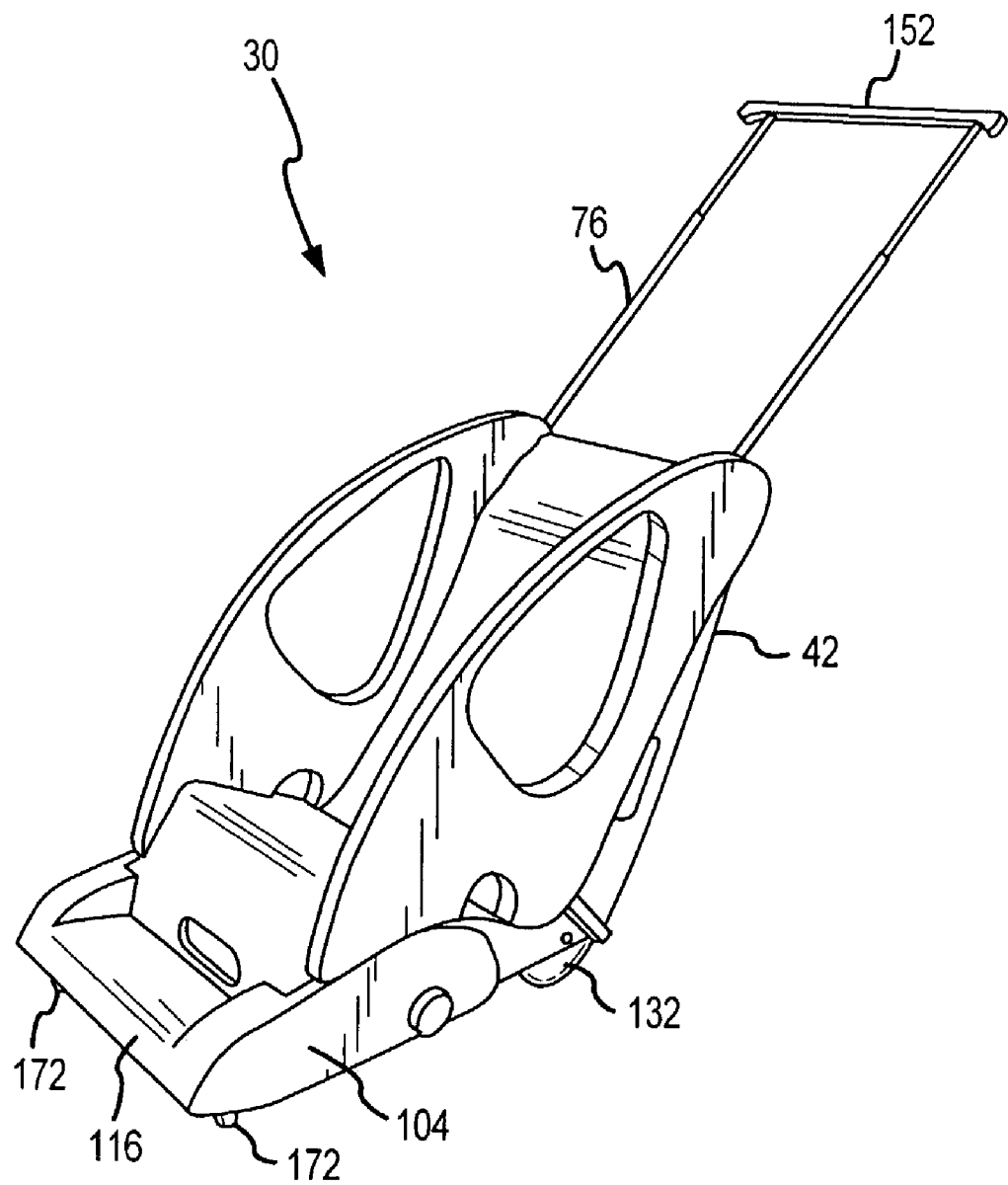
FIG. 12 is a front right-side perspective view of a third embodiment of the wheeled car seat in the stroller configuration.

FIG. 12 shows yet another alternative wheeled car seat conforming to aspects of the present invention. This wheeled car seat is shown configured as a stroller. As shown in FIG. 12, the wheeled car seat 30 includes seat wheels 132 and no cross member wheels. Because there are no cross member wheels, the cross member 116 could be supported by glides 172. The glides 172 should be oriented on the cross member 116 such that they will not interfere with the seat wheels 132 when the wheeled car seat 30 is placed in the car seat configuration. The extendable handle mechanism 76 is also connected with the rear portion 42 of the wheeled car seat 30. When a user desires to roll the wheeled car seat 30, he or she grasps the handle 152 and tips the wheeled car seat 30 back until the pivotal chassis 104 is suspended above the ground, and then pushes or pulls the wheeled car seat 30 in the desired direction as it rolls on the seat wheels 132. The wheeled car seat could also be configured with a gripping surface integral with the shell at a point where the user could push or pull the wheeled car seat. In an alternative configuration, the wheeled car seat could be configured with cross member wheels and no seat wheels. As previously discussed, the wheels may be fixed axis or caster design, and a single roller or wheel could be used instead of a plurality of wheels.

Although various embodiments of this invention have been described above with a certain degree of particularity or with reference to one or more individual embodiments, those skilled in the art could make numerous alterations to those disclosed embodiments without departing from the spirit or scope of this invention. It is intended that all matter contained in the above description and shown in the accompanying drawings shall be interpreted as illustrative only of particular embodiments, and not limiting. Changes in detail or structure may be made without departing from the basic elements of the invention as defined in the following claims.

What is claimed is:

1. A car seat capable of being converted to a stroller, said car seat comprising:
   a shell having a seat portion, a back portion, a first side portion, a second side portion, a rear portion, and a bottom portion;
   a gripping surface mounted on said first side portion and said second portion;
   at least a first wheel connected with said shell below said bottom portion;
   a pivotal chassis having a first arm and a second arm connected with a cross member, wherein said first arm and said second arm are connected with an axle cylinder and wherein said axle cylinder is pivotally connected with said first side portion and said second side portion;
   at least a second wheel connected with a bottom surface of said cross member; and
   a mechanism releasably engaging said axle cylinder to hold said pivotal chassis in a closed position wherein said bottom surface faces upward, an open position wherein said bottom surface faces downward, or an intermediate position.

2. A car seat capable of being converted to a stroller, said car seat comprising:
   a seat portion, a back portion, a first side portion, a second side portion, a rear portion, and a bottom portion;
   a gripping surface;
   at least one first wheel connected under said bottom portion;
   a pivotal chassis connected with a hollow axle cylinder, wherein said axle cylinder is pivotally connected with said first side portion and said second side portion under said bottom portion; and
   at least one second wheel connected with said pivotal chassis.

3. The car seat of claim 2 further comprising a mechanism releasably engaging said axle cylinder to hold said pivotal chassis in at least one position.

4. The car seat of claim 3 wherein said car seat is configured as a booster seat when said pivotal chassis is held in said at least one position.

5. The car seat of claim 3 wherein said pivotal chassis defines a bottom surface, and wherein said mechanism releasably engaging said axle cylinder holds said pivotal chassis in a first position wherein said bottom surface faces upward and a second position wherein said bottom surface faces downward.

6. The car seat of claim 5 wherein said pivotal chassis comprises a first pivot arm, a second pivot arm, and a cross member.

7. The car seat of claim 5 wherein said at least one first wheel and said at least one second wheel are located between said bottom surface and said bottom portion when said pivotal chassis is in said first position.

8. The car seat of claim 3 wherein said mechanism is a detent.

9. The car seat of claim 8 wherein said detent comprises a sliding plate having an engaging portion and a handle portion, and wherein said engaging portion engages said axle cylinder.

10. The car seat of claim 9 wherein said sliding plate is spring loaded.

11. The car seat of claim 3 wherein the car seat is configured as said stroller when said pivotal chassis is in said at least one position.

12. The car seat of claim 3 further comprising at least one slot located in said axle cylinder, wherein said mechanism further comprises a plate slidingly attached to said bottom portion, and wherein said plate selectively engages said at least one slot.

13. The car seat of claim 12 further comprising at least one spring connected with said plate and said bottom portion, wherein said at least one spring forces said plate against said axle cylinder.

14. The car seat of claim 2 wherein said at least one first wheel is a caster wheel.

15. The car seat of claim 2 wherein said at least one second wheel is a caster wheel.

16. The car seat of claim 2 wherein said at least one first wheel is a fixed axis wheel.

17. The car seat of claim 2 wherein said at least one second wheel is a fixed axis wheel.

18. The car seat of claim 2 wherein said pivotal chassis further comprises a foot rest.

19. The car seat of claim 2 wherein said rear portion is prow shaped.

20. The car seat of claim 2 further comprising a storage compartment formed in said rear portion.

21. The car seat of claim 2 wherein said first side portion defines at least one opening.

22. The car seat of claim 2 wherein said second side portion defines at least one opening.

23. The car seat of claim 2 wherein said first side portion, said second side portion, said rear portion, and said bottom portion comprise a shell.

24. The car seat of claim 23 wherein said shell is constructed of a lightweight plastic material.

25. The car seat of claim 24 wherein said lightweight plastic material is polycarbonate.

26. The car seat of claim 2 wherein said gripping surface further comprises an extendable handle mounted on said shell.

27. The car seat of claim 26 further comprising a tote removably attached to said extendable handle.

28. The car seat of claim 2 further comprising means for engaging said axle cylinder to hold said pivotal chassis in at least one position.

* * * * *